Oct. 26, 1926.
J. F. LINCOLN
ARC WELDING
Filed April 4, 1921
1,604,180
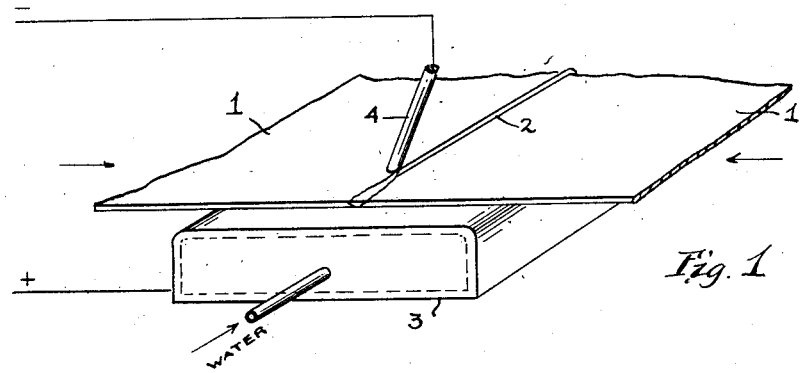
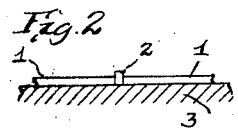
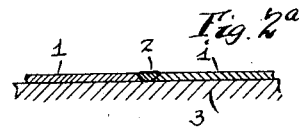
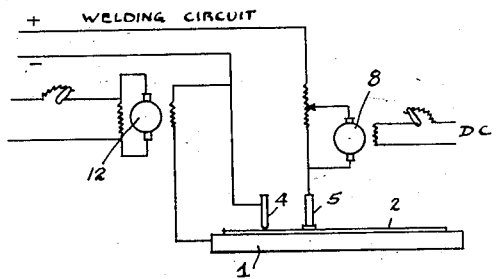
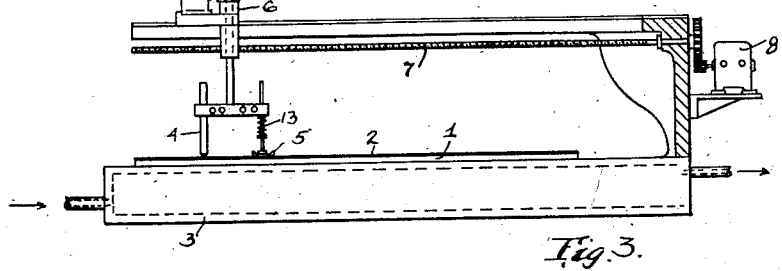
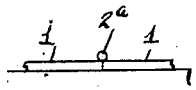
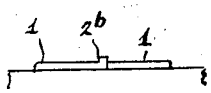
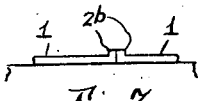
INVENTOR.
James F. Lincoln
BY
Fay, Oberlin & Fay
ATTORNEYS Patented Oct. 26, 1926.

1,604,180

UNITED STATES PATENT OFFICE.

JAMES F. LINCOLN, OF CLEVELAND, OHIO, ASSIGNOR TO THE LINCOLN ELECTRIC COMPANY, OF CLEVELAND, OHIO, A CORPORATION OF OHIO.

ARC WELDING.

Application filed April 4, 1921. Serial No. 458,263.

The difficulties involved in welding together light gauge metal sheets, particularly in the form of a continuous seam, are well recognized. The so-called "spot welding" process has avoided these difficulties to a certain degree, but obviously this form of juncture is not satisfactory where a tight closure is required between the parts, as, for example, in a sheet metal barrel or like container. Various methods of lap welding, in which the necessary heat is developed by the resistance of the joint to the passage of current thereacross, have been devised, but without proving wholly successful under the conditions stated. The object of the present invention accordingly is the provision of an arc welding process and apparatus for use therein whereby a continuous butt weld may be formed between the meeting edges of sheets of relatively light gauge, although of course such process and apparatus are not necessarily limited to working with such light gauge materials.

To the accomplishment of the foregoing and related ends, said invention, then, consists of the steps and means hereinafter fully described, the annexed drawing and the following description setting forth in detail certain means and one mode of carrying out the invention. Such disclosed means and mode illustrate, however, but several of various ways in which the principle of the invention may be used, it being noted that only the apparatus aspect of the invention is claimed herein, the process involved forming the subject matter of a separate divisional application, (filed February 23, 1923, Serial No. 620,746).

In said annexed drawing:—

Fig. 1 is a perspective view more or less diagrammatic in character, illustrating my improved method of welding; Fig. 2 is a cross-sectional detail; Fig. 2ª is a similar view showing the resultant joint; Fig. 3 is a side view of a typical apparatus; Fig. 4 is a diagram of the motor circuits involved in such apparatus; and Figs. 5, 6 and 7 are detail views similar to Fig. 2, but showing modifications.

The distinguishing features of my present improved process are perhaps best illustrated in Fig. 1, wherein the two sheets 1—1 are disposed with their edges which are to be joined together in substantially abutting relation. Sufficient space, however, is left between such edges for the insertion therebetween of a thin strip or wire 2 preferably of the same metal as the sheets. Said strip 2 is shown as of rectangular form in order more closely to fit the space between the edges of sheet 1, but may be of circular or other cross-sectional form providing the mass of material in said strip is somewhat in excess of that required to fill the space in question. In other words, upon being melted down and interfused with the edges the resultant seam 3 should resemble that shown in Fig. 2.

The sheets 1 with strip 2 thus interposed between their edges are preferably supported on a plate 3 of copper or other heat conducting material, and in order to increase the cooling effect of the plate the latter may be made hollow as indicated, with suitable connections for circulating water through its interior.

The welding, as previously indicated, is accomplished by means of an electric arc, a carbon electrode 4 being employed, and the welding circuit including such carbon and either the plate 3 and strip 2 or such strip alone. It has been found that, due to the small amount of contact which the strip has with the plate, where the return circuit is through the latter, the circuit will be more or less diverted through the sheets 1 which have a much larger area of contact with the plate and thus the fusion of the strip will be retarded. However, by returning the current directly through the strip, as by means of a brush 5 moving in unison with the electrode (see Fig. 3), it is rendered impossible for the arc to be diverted to either of the sheets and it is caused to play directly on the strip. The latter is thus quickly melted down as the carbon pencil is drawn along it and the adjacent edges of the sheet 1 interfused, forming a close and homogeneous joint that is smooth and continuous on both sides of the sheets.

The movement of the electrode, both longitudinally of the strip 2 and toward same, in order to vary the character of the arc, may be effected by means of suitable mechanism, more or less automatic in character. Thus the control of the rate of feed of the carbon along the strip or seam may be made to depend on the current flow or amperage through the arc, while the vertical feed of the electrode, i. e., its movement towards the strip or seam, may be controlled by the voltage across the arc. The arrangement of apparatus diagrammatically shown in Fig. 4 illustrates one way for thus automatically controlling the welding operation. The electrode 4, as well as the brush 5, which is here shown as forming the connection for the return circuit direct with strip 2, both depend from a suitable slide or carriage 6 that is mounted so as to be movable longitudinally of the work in line with the seam. For the purpose of thus feeding the slide 6 a screw 7 is provided, the same being rotated by a motor 8 that has adjustable fields with the armature circuit across a resistance in series with the arc, the fields being thus adjustable or variable so that the speed can be changed. For gradually lowering the electrode 4 the stem 10 of the the support for such electrode is vertically movable in slide 6, its movement being controlled by a nut 11 or equivalent device operated by a motor 12. A spring 13, in conjunction with the shoe 5 serves to hold the latter in contact with the strip 2, irrespective of the vertical position occupied by the electrode support. The motor 12, which is thus arranged to feed the electrode is of special construction, one field getting its exciting current as a shunt across the arc, the other field being excited from a constant source of voltage from some outside source, which can either be current from the exciter on the welder, or else current from some external direct current source. The two fields, under normal conditions, will be equal and so no movement of the armature will occur with the current flowing through it; however, if the arc becomes too long, the field excited across the arc will become stronger than the other field and the armature will turn in one direction, feeding the armature down. Conversely, when the arc became too short, the other field will become stronger than the field across the arc and will cause the armature to revolve in the opposite direction until the arc is of the proper length. In this way the voltage across the arc will be maintained constant at all times.

From the foregoing arrangement of apparatus it will be seen that not only is the electrode advanced longitudinally of the strip at a greater or lower rate of speed, depending upon the volume of the current flow, as determined by the adjustment of resistance 9, but the lowering of the electrode automatically occurs as the end of the latter burns away, due to the change in voltage across the arc.

In place of interposing a strip such as strip 2 between the meeting edges of the sheets to be welded, such edges may be brought directly into contact as shown in Fig. 5, and a strip corresponding with said strip 2 laid on top of the abutting edges. Such strip in this case may be circular in cross section as shown, or rectangular, as in the case of strip 2, and the latter may similarly be circular or any other desired shape. Furthermore, in place of the strip being entirely separate from the sheets, it may be formed as shown in Fig. 6 by turning up a portion of one of the sheets along the edge in question; or, as shown in Fig. 7, the edges of both sheets may be thus turned up.

The mode of operation and form of apparatus used, where the strip is formed and disposed as in these last mentioned figures, will remain the same as that previously described in connection with the arrangement wherein the strip is separate from, but clamped between the juxtaposed edges of the sheets.

It will be understood that while reference has hereinbefore been made to sheets 1 as though they were entirely independent of each other, they may consists simply of the opposite portions of a single sheet bent around into circular form so as to be brought into juxtaposition, in the fashion desired. The term "sheets" is accordingly to be interpreted as including either two wholly independent sheets, or parts of a sheet thus bent around and brought into substantially the same plane. The material of the sheets will, of necessity, be metal, such as iron or steel, capable of being worked electrically in the fashion described, and the strip, where separate from such sheets, may be of the same composition as the latter, or different as desired. Certain alloys of steel have a much greater tensile strength and better characteristics otherwise than the ordinary mild steel so that by making the strip or filler rod, where it is to be placed between the two sheets or laid on top of the joint, of such special alloy steel a weld of superior character may be secured. For example, if a filler rod of Harveyized armor plate steel is used a very tough steel will result, the tensile strength of which will exceed 100,000 pounds per square inch, while its ductility and toughness will be much greater than with the usual mild steel. By using filler rods of other alloys the character of the welding joint can be varied to suit special requirements. It will also be understood that the sheets as well as the strip, whatever the form of the latter, will be held in place by means of suitable clamps (not shown), pending the welding operation.

My improved process, in contra-distinction to that in which a metallic electrode is employed, produces a joint or weld that will bend much further without breaking, and is otherwise superior. This is due to the fact that with the metallic electrode method of welding each drop of metal cools by itself, and shrinkage stresses of very considerable amount are accordingly set up in the weld; whereas with the carbon electrode method, as hereinbefore described, the whole weld is heated to the same temperature and cooled at the same time, so that no such shrinkage stresses are set up.

Other forms may be employed embodying the features of my invention instead of the one here explained change being made as regards the mechanism herein disclosed, provided the means stated by any of the following claims or the equivalent of such stated means be employed.

I therefore particularly point out and distinctly claim as my invention:—

1. In apparatus of the character described, the combination of a support for the articles to be welded together, an electrode, means for traversing the latter longitudinally of the seam between such articles, an electric circuit including such electrode and the work, and an electric motor adapted to drive such traversing means, said motor having adjustable fields with the armature circuit across a resistance in series with the arc formed between said electrode and the work.

2. In apparatus of the character described, the combination of a support for the articles to be welded together, an electrode, means for feeding the latter towards the work, an electric circuit including said electrode and the work, and an electric motor adapted to drive such feeding means, said motor having one magnet field connected in shunt across the arc between said electrode and work, and another field excited from a constant potential source.

3. In apparatus of the character described, the combination of a support for the articles to be welded together, an electrode, means for feeding the latter towards the work, an electric circuit including said electrode and the work, a variable resistance also included in said circuit, an electric motor adapted to drive such feeding means, said motor having one magnet field connected in shunt across the arc between said electrode and work, and another field excited from a constant potential source, means for traversing said electrode longitudinally of the seam between such articles, and an electric motor adapted to drive such traversing means, said motor having adjustable fields with the armature circuit across a resistance in series with the arc formed between said electrode and the work.

4. In apparatus of the character described, the combination of a support for the work, a carbon electrode, an electric circuit including the work and said electrode, means for traversing the latter in a longitudinal direction, and means for positioning said electrode relatively to the work, the operation of said traversing means being controlled by the current flow through the arc between said electrode and the work, and the operation of said positioning means being controlled by the voltage across the arc between said electrode and the work.

Signed by me, this 31 day of March, 1921.

JAMES F. LINCOLN.